United States Patent [19]

Blickenderfer

[11] Patent Number: 4,575,930
[45] Date of Patent: Mar. 18, 1986

[54] NUCLEAR REACTOR FUEL ASSEMBLY PERIPHERAL ROD LIFTING DEVICE

[75] Inventor: Jack L. Blickenderfer, Forest Hills Borough, Pa.

[73] Assignee: Westinghouse Electric Corp., Pittsburgh, Pa.

[21] Appl. No.: 564,054

[22] Filed: Dec. 21, 1983

[51] Int. Cl.[4] .............................................. B23P 19/00
[52] U.S. Cl. ................................... 29/723; 29/400 N; 29/426.1; 29/426.2; 29/426.3; 29/709; 29/720; 376/250; 376/251; 376/260; 376/261; 376/271
[58] Field of Search ............... 29/400 N, 426.1, 426.2, 29/426.3, 709, 720, 723; 376/250, 251, 260, 261, 262, 264, 268, 271

[56] References Cited

U.S. PATENT DOCUMENTS

| | | | |
|---|---|---|---|
| 3,169,647 | 2/1965 | Hummel | 376/268 |
| 3,768,668 | 10/1973 | Schukei | 376/262 |
| 4,032,020 | 6/1977 | Kato et al. | 376/264 X |
| 4,460,536 | 7/1984 | Krieger | 376/268 |

FOREIGN PATENT DOCUMENTS 768456 10/1980 U.S.S.R. .............................. 29/723

Primary Examiner—Howard N. Goldberg
Assistant Examiner—Ronald S. Wallace
Attorney, Agent, or Firm—D. E. Erickson

[57] ABSTRACT

The specification discloses a device (32) for raising peripheral fuel rods of a fuel assembly for inspection under submerged conditions in a nuclear reactor facility. The device (32) includes a frame comprising top and bottom plates (36, 38) interconnected by rods (40) with an intermediate plate (52) supported therein for vertical movement responsive to a cylinder (60). A yoke (64) is mounted for horizontal movement on the intermediate plate (52) responsive to another cylinder (66) to engage a fuel rod so that it can then be lifted by the first cylinder (60). Proper alignment relative to the peripheral rods of the fuel assembly is accomplished by means of pins (50) which are received in indexing holes (80) of a support plate (68) for the fuel assembly.

10 Claims, 4 Drawing Figures

NUCLEAR REACTOR FUEL ASSEMBLY PERIPHERAL ROD LIFTING DEVICE

BACKGROUND OF THE INVENTION

The present invention relates generally to a lifting tool, and more particularly concerns a fluid powered tool adapted for underwater use in the spent fuel pits of nuclear reactor facilities to raise individual fuel rods within spent or damaged fuel assemblies for inspection.

Nuclear reactors of the type utilized in power generation incorporate a large number of fuel assemblies arranged in a suitable configuration. Each fuel assembly includes numerous fuel rods, each of which comprises a stack of fuel pellets inside a tube sealed by end plugs. The fuel rods are held in an organized array by a "skeleton" comprising grids spaced at lengthwise intervals, control rod guide thimbles interconnecting the grids and extending beyond the ends of the fuel rods, and top and bottom nozzles. The fuel rods are usually held in axial position by springs at the grids.

During initial installation and periodic shutdown of the reactor for refueling, the fuel rods are inspected for damage which might allow leakage and thus contamination of the primary coolant. It will be appreciated that the metal tubes of the fuel rods constitute the primary containment boundary for the radioactive nuclear fuel therein. Fuel rods may develop cracks, pin holes or other defects during service which must be detected; however, this is a difficult task. For one thing, the fuel rods are positioned in mutually closely spaced apart relationship and are integral parts of the fuel assemblies. Such inspection typically takes place in the spent fuel pit of the reactor facility where the irradiated fuel assemblies are submerged in neutron absorbing liquid such as water. It will thus be appreciated that inspection of irradiated nuclear fuel assemblies takes place under submerged and difficult conditions.

Fuel assemblies can also be subject to corrosion or wear, particularly at the points of contact between the fuel rods and the springs at the longitudinal grids. In order to inspect the fuel assemblies at these points, it is necessary to raise the fuel rods slightly to clear the area engaged by the springs for inspection by remote controlled camera. Heretofore, however, there has not been available a precision tool which is adapted for operation under water for selectively raising fuel rods in the fuel assembly for inspection. There is thus a need for such a device in order to facilitate this aspect of inspecting irradiated fuel assemblies while completely submereged.

SUMMARY OF INVENTION

The present invention comprises an apparatus which overcomes the foregoing and other difficulties associated with the prior art. In accordance with the invention, there is provided a device which is particularly adapted for raising preselected fuel rods along the periphery of a submerged fuel assembly. The device comprises a rigid frame including two spaced-apart plates. The top plate is adapted for connection to a tool handling rod by which the device can be remotely manipulated while submerged. The base plate of the frame includes locating pins which are adapted for engagement with tool indexing holes in a support plate. The tool indexing holes are provided adjacent to a block on which the fuel assembly is positioned, with the spacing between adjacent holes corresponding to that between adjacent peripheral fuel rods in the fuel assembly. Within the frame of the device, an intermediate plate is mounted for vertical movement responsive to a double-acting cylinder. A yoke adapted at one end for engagement with a portion of a fuel rod is mounted on the intermediate plate for horizontal movement responsive to another double-acting cylinder. After the fuel assembly has been positioned on the block and the device has been located on the support plate, the horizontal cylinder is first actuated followed by actuation of the vertical cylinder to raise the desired peripheral rod a predetermined distance for inspection purposes.

BRIEF DESCRIPTION OF THE DRAWINGS

A better understanding of the invention can be had by reference to the following Detailed Description in conjunction with the accompanying Drawings, wherein.

DESCRIPTION OF THE PREFERRED EMBODIMENTS

Figure 1:
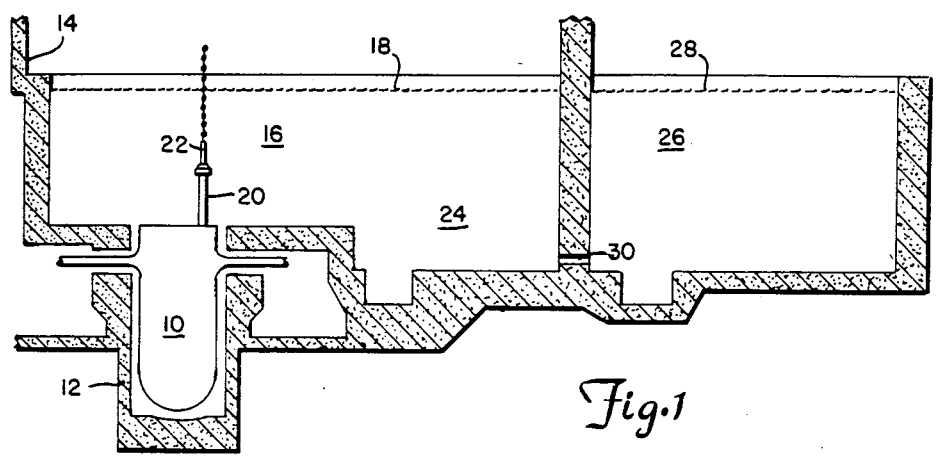
FIG. 1 is a sectional view of a typical nuclear reactor installation in which the present invention is adapted for use.

Referring now to the Drawings, wherein like reference numerals designate like or corresponding elements throughout the views, and particularly referring to FIG. 1, there is shown a typical nuclear reactor installation in which the reactor 10 is supported within a concrete housing 12. The housing 12 forms part of a generally domed concrete enclosure 14 which includes a basin or pool 16 above the reactor 10. Only the lower portion of the enclosure 14 is shown and it will be understood that it may be of any suitable design. During normal operation, the interior of the pool 16 is empty, but during refueling operations it is filled with water up to a level as indicated at 18, so that the fuel assemblies 20 are always submerged in water. Suitable crane or other lifting facilities are provided on tracks (not shown) in the upper part of the enclosure 14 for lifting a fuel assembly 20 from the reactor 10 by means of suitable lifting means 22 suspended from the overhead crane. Communicating with or forming a part of the pool 16 is a refueling canal 24 of concrete which extends to the outer wall of the enclosure 14 as shown.

A spent fuel pit 26 of concrete is provided outside the enclosure 14. The spent fuel pit 26 is filled with water up to a level 28 which is equal to level 18. The refueling canal 24 and spent fuel pit 26 are connected by an opening 30 which permits transfer of fuel assemblies from the reactor enclosure 14 by means of suitable transfer means (not shown) so that the fuel assemblies can be inspected in the fuel pit while safely submerged under water. As will be explained more fully hereinafter, the present invention is directed to an apparatus for underwater use in the spent fuel pit 26 for selectively raising peripheral fuel rods within a fuel assembly 20 for inspection.

Figure 2:
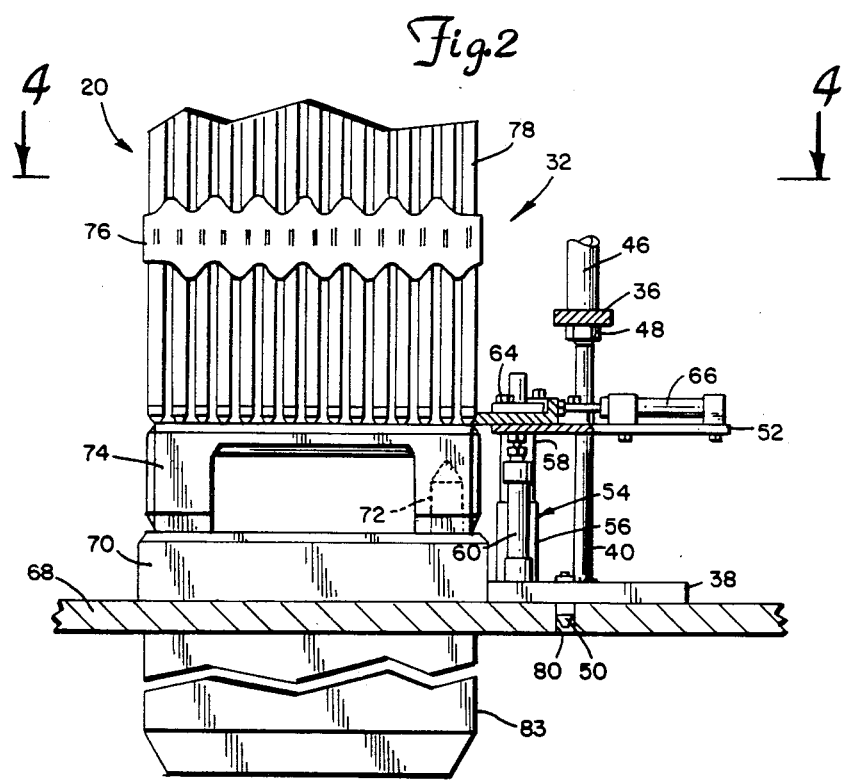
FIG. 2 is side view (partially cutaway) showing the apparatus of the invention located adjacent to a fuel assembly.
Figure 3:
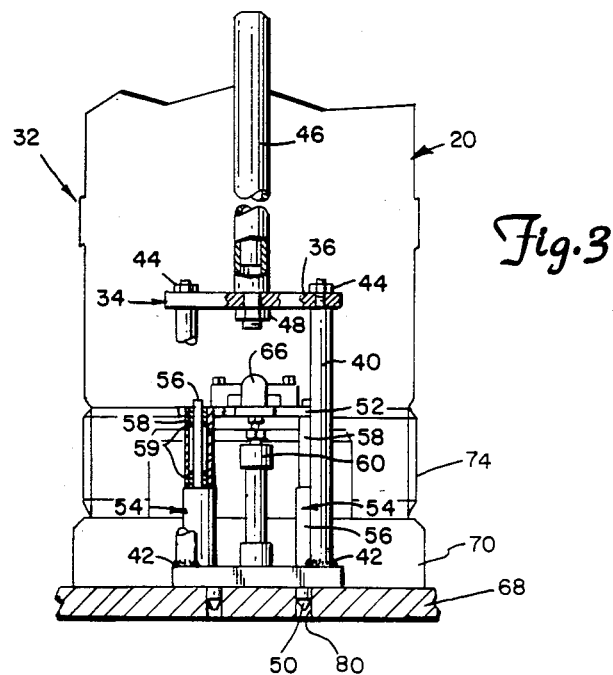
FIG. 3 is an end view (partially cutaway) of the apparatus herein.
Figure 4:
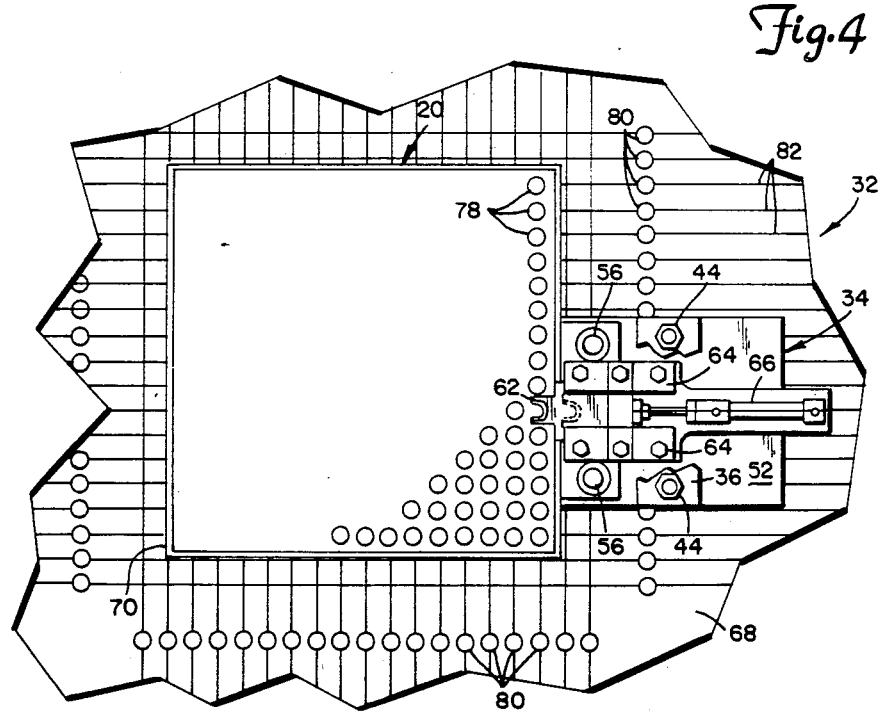
FIG. 4 is a horizontal sectional view (partially cutaway) taken generally along lines 4—4 of FIG. 2 in the direction of the arrows.

The fuel rod lifting apparatus 32 of the invention is shown in FIGS. 2-4. The apparatus 32 includes a rigid frame 34 comprising a pair of plates 36 and 38 interconnected by a pair of vertical rods 40. As illustrated, the lower ends of the rods 40 are reduced for snug receipt in holes provided in the base plate 38, and are secured to the plate by welds 42 without extending completely through or beyond the lower side of the base plate. Nuts 44 are provided on the reduced and threaded upper ends of rods 40 for securing the top plate 36 thereto to form frame 34. The top plate 36 is adapted for connection to a tool handling rod 46 by means of a nut 48 or other suitable fastener. The apparatus 32 is manipulated through the tool handling rod 46 from the bridge or crane (not shown) above the spent fuel pit 26. A pair of locating pins 50 extend downward from the base plate 38 for aligning the apparatus 32 relative to a fuel assembly 20 as will be explained more fully hereinbelow.

The apparatus 32 also includes a movable intermediate plate 52 which is supported for vertical movement along guides 54. The guides 54 can be of any suitable construction. For example, as illustrated the guides 54 each include a stainless steel support rod 56 mounted on the base plate 38. The reduced upper end of the support rod 56 extends through a collar 58 and associate opening in the intermediate plate 52. Bronze bushings 59 can be provided inside the collar 58 to facilitate relative sliding movement with the support rod 56. A double-acting cylinder 60 is connected between plates 38 and 52 for raising and lowering the intermediate plate.

A yoke 62 is supported between a pair of opposing slide ways 64 on the intermediate plate 52 for horizontal movement. The nose of the yoke 62 is generally C-shaped with a beveled edge for engaging the beveled lower end plug of a fuel rod. FIG. 4 shows the yoke 62 in its extended position with full lines, and in its retracted position with phantom lines. A double acting cylinder 66 is connected between the yoke 62 and plate 52 for effecting selective horizontal movement of the yoke for engaging a fuel rod.

The apparatus 32 operates as follows. The support plate 68, including block 70, guide pins 72 and guide fixture 83, is positioned on a spent fuel rack. Guide fixture 83 positions support plate 68 on a fuel cell by extending approximately 24 inches into the fuel cell. Fuel assembly 20 is next positioned on block 70 in a vertical position by use of the two fuel assembly guide pins 72, only one of which is shown, in cooperation with the bottom nozzle 74 of fuel assembly 20. The bottom nozzle 74, grids 76, only one of which is shown, and a top nozzle (not shown) constitute the "skelton" or frame of the fuel assembly 20 in which the array of fuel rods 78 are secured. The block 70 and guide pins 72 thus function to locate the fuel assembly 20 in a predetermined position.

After the fuel assembly has been located in the desired position, the fuel rod lifting device 32 is then manipulated by means of the handling rod 46 and located in proper alignment relative to one of the fuel rods 78. The side of block 70 and front edge of base plate 38 cooperate to guide the frame 34 into position. Indexing holes 80 are provided in the support plate 68 along at least one side of the block 70 which are of the same spacing or pitch as the rods 78 in the fuel assembly 20. Scribe lines 82 are also preferably provided on the plate 68 for alignment with the centerline of the cylinder 66 to facilitate manipulation of the apparatus 32 and location of the guide pins 50 thereof in the appropriate pair of indexing holes for the particular fuel rod 78 which is desired to be raised.

After the apparatus 32 has been located adjacent to the desired peripheral fuel rod 78, the cylinder 66 is first actuated to engage the yoke 62 with the bottom end plug of the fuel rod, and then the cylinder 60 is actuated to raise the fuel rod a predetermined distance, such as about one inch, for inspection as desired. Cylinder 60 and then cylinder 66 are retracted following inspection of the fuel rod 78 so that the apparatus 32 can be repositioned as desired.

From the foregoing, it will thus be apparent that the present invention comprises a new and useful fuel rod lifting device having several advantages over the prior art. One advantage involves the fact that the device herein is particularly adapted for use under remote controlled submerged conditions for purposes of effecting precise engagement and lifting of the peripheral fuel rods in a nuclear fuel assembly. The apparatus herein is of relatively straightforward, reliable construction and is adapted for precise positioning relative to the fuel assembly by means of pins and indexing holes. Other advantages will be evident to those skilled in the art.

Although particular embodiments of the invention have been illustrated in the accompanying Drawings and described in the foregoing Detailed Description, it will be understood that the invention is not limited to the embodiments disclosed, but is intended to embrace any alternatives, equivalents, modifications and/or rearrangements of elements falling within the scope of the invention as defined by the following Claims.

What is claimed is:

1. Apparatus for lifting a fuel rod in a fuel assembly, comprising:
   means for supporting the fuel assembly in a predetermined position;
   a frame adapted for movement relative to said fuel assembly support means;
   locating pins secured to said frame for registry with index holes in said fuel assembly support means for effecting adjustable predetermined alignment between said frame and the fuel rods in said fuel assembly;
   a plate supported on said frame for generally longitudinal movement relative to said fuel assembly
   a yoke supported on said plate for generally lateral movement relative to said fuel assembly, one end of said yoke being adapted to engage a fuel rod;
   a first cylinder coupled between said plate and yoke for effecting selective lateral movement thereof between an extended position in engagement with a fuel rod, and a retracted position out of engagement with a fuel rod; and
   a second cylinder coupled between said plate and frame for effecting selective longitudinal movement thereof between extended and retracted positions to lift a fuel rod as desired.

2. The apparatus of claim 1, wherein said fuel assembly support means comprises:
   a support plate;
   a block on said support plate for supporting the fuel assembly in a raised position;
   the index holes of said fuel assembly support means being arranged adjacent to at least one side of said block in predetermined spaced apart intervals corresponding to the spacing between adjacent peripheral rods of said fuel assembly.

3. The apparatus according to claim 2, further including:

locating means on said block for cooperation with a portion of said fuel assembly to effect predetermined alignment between said fuel assembly and support means.

4. The apparatus of claim 1, wherein said frame comprises:
a top plate;
a baseplate; and
a plurality of rods rigidly secured between said top and base plates.

5. The apparatus of claim 1, wherein said first and second cylinders each comprise double-acting pneumatic cylinders.

6. The apparatus of claim 1, further including:
scribe lines on said fuel assembly support means to facilitate location of said locating pins in the index holes of said fuel assembly support means.

7. Apparatus for lifting a fuel rod of a fuel assembly while submerged for inspection or the like, comprising:
a support plate;
locating means on said support plate for cooperation with a portion of a fuel assembly to effect predetermined relative positioning between said fuel assembly and support plate;
a movable frame;
locating pins on said frame for cooperation with indexing holes in said support plate for adjustable predetermined alignment between said frame and peripheral fuel rods in said fuel assembly;
an intermediate plate supported on said frame for generally vertical movement;
a yoke supported on said intermediate plate for generally horizontal movement, one end of said yoke being adapted to engage a predetermined portion of a fuel rod;
a first cylinder coupled between said plate and yoke for effecting selective movement thereof between an extended position in engagement with a fuel rod, and a retracted position out of engagement with a fuel rod; and
a second cylinder coupled between said plate and frame for effecting selective movement thereof between extended and retracted positions to lift the fuel rod as desired.

8. The apparatus of claim 7, wherein said fuel assembly positioning means comprises:
a block on said support plate for supporting said fuel assembly in predetermined raised position; and
two locating pins on said block adapted for engagement with a lower portion of a fuel assembly to effect predetermined relative alignment between said fuel assembly, block, and thus the indexing holes in said support plate.

9. The apparatus of claim 5, wherein said frame comprises:
a top plate;
a baseplate; and
a plurality of rods rigidly secured between said top and base plates.

10. The apparatus of claim 7, further including:
predetermined indicia on said support plate associated with the indexing holes to facilitate remote control positioning of said frame and locating pins relative to the fuel rods of said fuel assembly.

* * * * *